United States Patent Office 3,445,519
Patented May 20, 1969

3,445,519
PROCESS FOR PREPARING 5-(3-METHYL-
AMINO-PROPYL - OR - PROPYLIDENE)-
5H - DIBENZO CYCLOHEPTENES OR
10,11-DIHYDRO COMPOUNDS
Janos Kollonitsch, Westfield, N.J., assignor to Merck &
Co., Inc., Rahway, N.J., a corporation of New Jersey
No Drawing. Application Mar. 10, 1965, Ser. No.
438,780, now Patent No. 3,379,750, dated Apr. 23,
1968, which is a continuation-in-part of application Ser.
No. 194,660, May 14, 1962. Divided and this application Nov. 14, 1967, Ser. No. 705,577
Int. Cl. C07c 85/02
U.S. Cl. 260—570.8        6 Claims

ABSTRACT OF THE DISCLOSURE

Compounds selected from 5H - dibenzo[a,d]10,11-dihydrocycloheptenes and 5H - dibenzo[a,d]cycloheptenes, substituted at the 5-carbon atom with a secondary aminopropyl or secondary aminopropylidene radical, are prepared from the corresponding tertiary-aminopropyl or propylidene compounds by reaction of the tertiaryamino compounds with a halothiolformate to produce a thiourethane intermediate, oxidizing the urethane reaction product and subsequently hydrolyzing the thiourethane intermediate to produce the desired secondary amino compound.

---

This is a division of application Ser. No. 438,780 filed Mar. 10, 1965 and now U.S. Patent No. 3,379,750 which is a continuation-in-part of my copending application Ser. No. 194,660, filed May 14, 1962 and now abandoned.

This invention relates to a novel method for making derivatives of dibenzocycloheptenes, and more particularly the invention relates to a method of making 5H-dibenzo[a,d] - 10,11 - dihydrocycloheptenes and 5H-dibenzo[a,d]cycloheptenes which are substituted at the 5-carbon atom with a secondary aminopropyl or secondary aminopropylidene radical. The invention also relates to intermediates which are useful in preparing the above compounds and a method of preparing the same.

The end compounds of the invention are useful in the treatment of mental health conditions as they are antidepressants and serve as mood elevators or psychic energizers. The compounds are preferably administered in the form of their acid additional salts and these salts are included in the scope of this invention.

The end compounds formed by the method of the invention may be represented by the following general formulas:

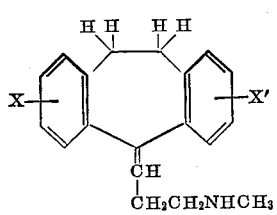

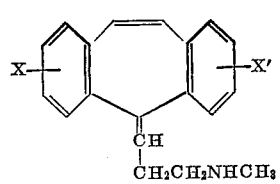

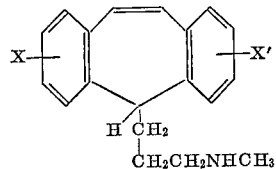

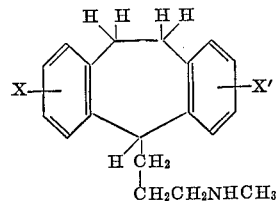

wherein X and X' may be similar or dissimilar and are selected from the group consisting of hydrogen, lower alkyl, lower alkoxy, lower alkenyl, haloloweralkyl, phenyl or substituted phenyl, an acyl group having up to 4 carbon atoms, haloacyl having up to 4 carbon atoms, a loweralkylsulfonylamino, halogen, hydroxyl, halolower-alkoxy, cyano, carboxy, carbamyl, loweralkylcarbamyl, diloweralkylcarbamyl, loweralkoxycarbonyl, mercapto, loweralkylmercapto, haloloweralkylmercapto, loweralkylsulfonyl, haloloweralkylsulfonyl, sulfamyl, loweralkylsulfamyl, diloweralkysulfamyl; more than one of those substituents may be on each benzenoid ring.

Representative compounds which may be prepared in accordance with the instant invention include:

5-(3-methylaminopropyl)-5H-dibenzo[a,d]cycloheptene,
10,11-dihydro-5-(3-methylaminopropyl)-5H-dibenzo[a,d]cycloheptene,
5-(3-methylaminopropylidene)-5H-dibenzo[a,d]cycloheptene,
10,11-dihydro-5-(3-methylaminopropylidene)-5H-dibenzo[a,d]cycloheptene,
3-chloro-5-(3-methylaminopropyl)-5H-dibenzo[a,d]cycloheptene,
3-methyl-5-(3-methylaminopropylidene)-5H-dibenzo[a,d]cycloheptene,
5-(3-methylaminopropyl)-3-methylsulfonyl-5H-dibenzo[a,d]cycloheptene,
5-(3-methylaminopropylidene)-3-methylsulfonyl-5H-dibenzo[a,d]cycloheptene,
3-dimethylsulfamoyl-5-(3-methylaminopropyl)-5H-dibenzo[a,d]cycloheptene,
10,11-dihydro-3-dimethylsulfamoyl-5-(3-methylaminopropylidene)-5H-dibenzo[a,d]cycloheptene, It should be noted that with regard to the process described herein, the essence of the invention resides in the conversion of the dimethylaminopropylidene (propyl) side chain to the monomethylaminopropylidene (propyl) substituent and not in the particular groups which may be attached to either or both of the benzene moieties. Accordingly, the process of the invention may be utilized for the preparation of nuclearly unsubstituted as well as nuclearly substituted derivatives by employing the appropriate unsubstituted or nuclearly substituted tertiary-aminopropylidene (propyl) compound. It will be readily recognized by those skilled in the art that the process may be utilized for the preparation of those nuclearly substituted compounds wherein the nuclear substituents remain unaffected during the reaction and the nuclear substituents mentioned hereinabove are merely representative and are not to be construed as limiting the invention.

The method of the present invention may be illustrated schematically by the following flow sheet in which the dotted lines indicate the compound may be saturated or unsaturated at the indicated positions, X and X' are as previously defined and R is alkyl, aryl, aralkyl or alkaryl.

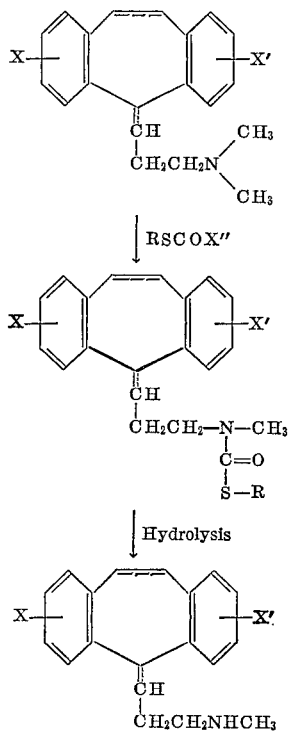

It will be readily apparent to those skilled in the art that inasmuch as the R group is recovered during the process, it is not critical which particular R group is utilized to form the intermediate thiourethane and the choice thereof is subject only to the limitations of ease of hydrolysis and other practical and economical considerations. However, the preferred groups are lower alkyl having up to 6 carbon atoms, phenyl, tolyl, p-chlorophenyl and benzyl.

The method of the present invention begins with the known aminopropylidene or aminopropyl compounds which are described in several places in the literature, e.g., in British Patents Nos. 858,187 and 858,188, in the Journal of Organic Chemistry, volume 27, page 230 (1962), and elsewhere. These compounds are prepared from, for example, the known 5H-dibenzo[a,d]cyclohepten-5-ones and 5H - dibenzo[a,d] - 10,11 - dihydrocyclohepten - 5-ones which, in turn, may be prepared by using the process described by A. C. Cope et al. in an article entitled, "Cyclic Polyolefins, XV, 1-methylene-2,3,6,7-dibenzocycloheptatriene," appearing in the J.A.C.S., 73, 1673–1678 (1951) and elsewhere, or the starting compounds, and particularly those having substituents on the benzene rings, may be made by following the teachings of T. W. Campbell et al. in an article entitled "Synthesis of 2'-acetamido-2,3,6,7-dibenzotropilidine and 2-acetamido-9,9-dimethylfluorene," appearing in Helv. Chem. Acta, 36, 1489–1499 (1953).

As shown in the flow sheet above, the first step of the method of the present invention involves the condensation of a dimethylaminopropylidene or dimethylaminopropyl derivative of a 5H-dibenzo[a,d,]cycloheptene with a halo-thiolformate to produce a thiourethane intermediate. In a typical run, 5-[3-(N-dimethylamino)propylidene]-5H-dibenzo[a,d]cycloheptene is reacted with methyl chlorothiolformate to produce the thiourethane product 5-[3-(N-methyl - N - methylmercaptoformylamino)propylidene]- 5H-dibenzo[a,d,]cycloheptene and methyl chloride. The reaction is most conveniently carried out in an inert, organic solvent such as benzene, and at the reflux temperature of the system. However, neither the temperature or solvent employed is critical. Thus, the reaction may be carried out at room or elevated temperatures employing other inert, organic solvents capable of solubilizing the intermediate thiourethane such as toluene, heptene, hexane, chloroform, carbon tetrachloride and tetrahydrofuran.

The urethane intermediate thus produced is then hydrolyzed to convert the substituted thiocarbamyl group of the thiourethane to a hydrogen atom. It is preferred, however, to first oxidize the thiourethane prior to carrying out the hydrolysis. The oxidation may be carried out employing any of the conventional oxidizing agents such as hydrogen peroxide, peracetic acid, perbenzoic acid, chromic acid and potassium permanganate. The hydrolysis can then be effected in either an acidic or basic medium, or even in water alone. Where it is desired to hydrolyze the thiourethane without subjecting the same to oxidation, the hydrolysis should be effected in a basic medium, such as sodium hydroxide, or in the presence of a metal, such as lead or silver, which will react with the mercaptan to form an insoluble mercaptide.

The product of the hydrolysis is the desired secondary aminopropylidene or secondary aminopropyl derivative of a 5H-dibenzo[a,d,]cycloheptene or 5H-dibenzo[a,d]-10,11-dihydrocycloheptene.

The examples which follow will further illustrate the invention.

EXAMPLE 1

5-[3-(N-methyl-N-methylmercaptoformylamino)propylidene]-5H-dibenzo[a,d]cycloheptene 6.9 g. of 5-(3-dimethylaminopropylidene)-5H-dibenzo[a,d,]cycloheptene (0.025 mole) is dissolved in 20 ml. of benzene and a solution of 2.76 g. (0.025 mole) of methyl chlorothiolformate in 10 ml. of benzene is added during about 15 minutes while the mixture is stirred at room temperature. The solution is refluxed with stirring for 1½ hours, cooled to room temperature, filtered, the filtrate extracted with 2.5 N HCl (3×25 ml.), washed with water, dried over MgSO$_4$ and evaporated in vacuo. A thick, colorless oil rapidly crystallizes. Yield 5.8 g. (69% of theory). For analysis, the product is recrystallized from 15 ml. of ethanol to produce 5.09 g. of glistening needles, M.P. 106–108° C.

Analysis.—$C_{21}H_{21}NOS$. Molecular weight, 335.25. Calcd.: C, 75.0; H, 6.35; N, 4.2; S, 9.60%. Found: C, 75.16; H, 6.36; N, 3.86; S, 9.61%.

EXAMPLE 2

Following the procedure described in Example 1, and substituting the thiolformates enumerated below for methyl chlorothiolformate of Example 1, there are obtained the products enumerated below.

| Thioformate | Product |
|---|---|
| Ethyl chlorothiolformate | 5-[3-(N-methyl-N-ethylmercaptoformylamino)propylidene]-5H-dibenzo[a,d]cycloheptene. |
| Octyl chlorothiolformate | 5-[3-(N-methyl-N-octylmercaptoformylamino)propylidene]-5H-dibenzo[a,d]cycloheptene. |
| Methyl bromothiolformate | 5-[3-(N-methyl-N-methylmorcaptoformylamino)propylidene]-5H-dibenzo[a,d]cycloheptene. |
| Phenyl chlorothiolformate | 5-[3-(N-methyl-N-phenylmercaptoformylamino)propylidene]-5H-dibenzo[a,d]cycloheptene. |
| p-Chlorophenylchlorothiolformate. | 5-[3-(N-methyl-N-p-chlorophenylmercaptoformylamino)propylidene]-5H-dibenzo[a,d]cycloheptene. |
| p-Totyl chlorothiolformate | 5-[3-(N-methyl-N-p-tolylmercaptoformylamino)propylidene]-5H-dibenzo[a,d]cycloheptene. |
| Benzyl chlorothiolformate | 5-[3-(N-methyl-N-benzylmercaptoformylamino)propylidene]-5H-dibenzo[a,d]cycloheptene. |

EXAMPLE 3

Following the procedure described in Example 1, and substituting the dibenzocycloheptenes enumerated below for 5 - (3 - dimethylaminopropylidene) - 5H - dibenzo-

[a,d]cycloheptene, there are obtained the products enumerated below.

| Dibenzocyloheptene | Product |
| --- | --- |
| 3-chloro-5-(3-dimethylaminopropylidene)-5H-dibenzo[a,d]cycloheptene. | 3-chloro-5-[3-(N-methyl-N-methylmercaptoformylamino)propylidene]-5H-dibenzo[a,d]cycloheptene. |
| 5-(3-dimethylaminopropylidene)-3-methyl-5H-dibenzo[a,d]cycloheptene. | 3-methyl-5-[3-(N-methyl-N-methylmercaptoformylamino)propylidene]-5H-dibenzo[a,d]cycloheptene. |
| 5-(3-dimethylaminopropyl)-3-methylsulfonyl-5H-dibenzo[a,d]cycloheptene. | 3-methylsulfonyl-5-[3-(N-methyl-N-methylmercaptoformylamino)propyl]-5H-dibenzo[a,d]cycloheptene. |
| 5-(3-dimethylaminopropylidene)-3-methylsulfonyl-5H-dibenzo[a,d]cycloheptene. | 3-methylsulfonyl-5-[3-(N-methyl-N-methylmercaptoformylamino)propylidene]-5H-dibenzo[a,d]cycloheptene. |
| 5-(3-dimethylaminopropyl)-3-dimethylsulfamoyl-5H-dibenzo[a,d]cycloheptene. | 3-dimethylsulfamoyl-5-[3-(N-methyl-N-methylmercaptoformylamino)propyl]-5H-dibenzo[a,d]cycloheptene. |
| 5-(3-dimethylaminopropylidene)-3-dimethylsulfamoyl-5H-dibenzo[a,d]cycloheptene. | 3-dimethylsulfamoyl-5-[3-(N-methyl-N-methylmercaptoformylamino)propylidene]5H-dibenzo[a,d]cycloheptene. |

EXAMPLE 4

Following the procedure described in Example 1, and employing the thiolformates of Example 2 and the dibenzocycloheptenes of Example 3 for the thiolformate and dibenzocycloheptene employed in Example 1, there are obtained the following products:

3-chloro-5-[3-(N-methyl-N-ethylmercaptoformylamino)propylidene]-5H-dibenzo[a,d]cycloheptene 3-chloro-5-[3-(N-methyl-N-octylmercaptoformylamino)propylidene]-5H-dibenzo[a,d]cycloheptene 3-chloro-5-[3-(N-methyl-N-methylmercaptoformylamino)propylidene]-5H-dibenzo[a,d]cycloheptene 3-chloro-5-[3-(N-methyl-N-phenylmercaptoformylamino)propylidene]-5H-dibenzo[a,d]cycloheptene 3-chloro-5-[3-(N-methyl-N-p-chlorophenylmercaptoformylamino)propylidene]-5H-dibenzo[a,d]cycloheptene 3-chloro-5-[3-(N-methyl-N-p-tolylmercaptoformylamino)propylidene]-5H-dibenzo[a,d]cycloheptene 3-chloro-5-[3-(N-methyl-N-benzylmercaptoformylamino)propylidene]-5H-dibenzo[a,d]cycloheptene 5-[3-(N-methyl-N-ethylmercaptoformylamino)propylidene]-3-methyl-5H-dibenzo[a,d]cycloheptene 5-[3-(N-methyl-N-octylmercaptoformylamino)propylidene]-3-methyl-5H-dibenzo[a,d]cycloheptene 5-[3-(N-methyl-N-methylmercaptoformylamino)propylidene]-3-methyl-5H-dibenzo[a,d]cycloheptene 5-[3-(N-methyl-N-phenylmercaptoformylamino)propylidene]-3-methyl-5H-dibenzo[a,d]cycloheptene 5-[3-(N-methyl-N-p-chlorophenylmercaptoformylamino)propylidene]-3-methyl-5H-dibenzo[a,d]cycloheptene 5-[3-(N-methyl-N-p-tolylmercaptoformylamino)propylidene]-3-methyl-5H-dibenzo[a,d]cycloheptene 5-[3-(N-methyl-N-benzylmercaptoformylamino)propylidene]-3-methyl-5H-dibenzo[a,d]cycloheptene 5-[3-(N-methyl-N-ethylmercaptoformylamino)propyl]-3-methylsulfonyl-5H-dibenzo[a,d]cycloheptene 5-[3-(N-methyl-N-octylmercaptoformylamino)propyl]-3-methylsulfonyl-5H-dibenzo[a,d]cycloheptene 5-[3-(N-methyl-N-methylmercaptoformylamino)propyl]-3-methylsulfonyl-5H-dibenzo[a,d]cycloheptene 5-[3-(N-methyl-N-phenylmercaptoformylamino)propyl]-3-methylsulfonyl-5H-dibenzo[a,d]cycloheptene 5-[3-(N-methyl-N-p-chlorophenylmercaptoformylamino)propyl]-3-methylsulfonyl-5H-dibenzo[a,d]cycloheptene 5-[3-(N-methyl-N-p-tolylmercaptoformylamino)propyl]-3-methylsulfonyl-5H-dibenzo[a,d]cycloheptene 5-[3-(N-methyl-N-benzylmercaptoformylamino)propyl]-3-methylsulfonyl-5H-dibenzo[a,d]cycloheptene 5-[3-(N-methyl-N-ethylmercaptoformylamino)propylidene]-3-methylsulfonyl-5H-dibenzo[a,d]cycloheptene 5-[3-(N-methyl-N-octylmercaptoformylamino)propylidene]-3-methylsulfonyl-5H-dibenzo[a,d]cycloheptene 5-[3-(N-methyl-N-methylmercaptoformylamino)propylidene]-3-methylsulfonyl-5H-dibenzo[a,d]cycloheptene 5-[3-(N-methyl-N-phenylmercaptoformylamino)propylidene]-3-methylsulfonyl-5H-dibenzo[a,d]cycloheptene 5-[3-(N-methyl-N-p-chlorophenylmercaptoformylamino)propylidene]-3-methylsulfonyl-5H-dibenzo[a,d]cycloheptene 5-[3-(N-methyl-N-p-tolylmercaptoformylamino)propylidene]-3-methylsulfonyl-5H-dibenzo[a,d]cycloheptene 5-[3-(N-methyl-N-benzylmercaptoformylamino)propylidene]-3-methylsulfonyl-5H-dibenzo[a,d]cycloheptene 3-dimethylsulfamoyl-5-[3-(N-methyl-N-ethylmercaptoformylamino)propyl]-5H-dibenzo[a,d]cycloheptene 3-dimethylsulfamoyl-5-[3-(N-methyl-N-octylmercaptoformylamino)propyl]-5H-dibenzo[a,d]cycloheptene 3-dimethylsulfamoyl-5-[3-(N-methyl-N-methylmercaptoformylamino)propyl]-5H-dibenzo[a,d]cycloheptene 3-dimethylsulfamoyl-5-[3-(N-methyl-N-phenylmercaptoformylamino)propyl]-5H-dibenzo[a,d]cycloheptene 3-dimethylsulfamoyl-5-[3-(N-methyl-N-p-chlorophenylmercaptoformylamino)propyl]-5H-dibenzo[a,d]cycloheptene 3-dimethylsulfamoyl-5-[3-(N-methyl-N-p-tolylmercaptoformylamino)propyl]-5H-dibenzo[a,d]cycloheptene 3-dimethylsulfamoyl-5-[3-(N-methyl-N-benzylmercaptoformylamino)propyl]-5H-dibenzo[a,d]cycloheptene 3-dimethylsulfamoyl-5-[3-(N-methyl-N-ethylmercaptoformylamino)propylidene]-5H-dibenzo[a,d]cycloheptene 3-dimethylsulfamoyl-5-[3-(N-methyl-N-octylmercaptoformylamino)propylidene]-5H-dibenzo[a,d]cycloheptene 3-dimethylsulfamoyl-5-[3-(N-methyl-N-methylmercaptoformylamino)propylidene]-5H-dibenzo[a,d]cycloheptene 3-dimethylsulfamoyl-5-[3-(N-methyl-N-phenylmercaptoformylamino)propylidene]-5H-dibenzo[a,d]cycloheptene 3-dimethylsulfamoyl-5-[3-(N-methyl-N-p-chlorophenylmercaptoformylamino)propylidene]-5H-dibenzo[a,d]cycloheptene 3-dimethylsulfamoyl-5-[3-(N-methyl-N-p-tolylmercaptoformylamino)propylidene]-5H-dibenzo[a,d]cycloheptene 3-dimethylsulfamoyl-5-[3-(methyl-N-benzylmercaptoformylamino)propylidene]-5H-dibenzo[a,d]cycloheptene

EXAMPLE 5

5-(3-methylaminopropylidene)-5H-dibenzo[a,d]cycloheptene 1.68 g. of 5-[3-(N-methyl-N-methylmercaptoformylamino)propylidene]-5H-dibenzo[a,d]cycloheptene (0.005 mole) is dissolved with gentle heating in 13 ml. of glacial acetic acid. After cooling to room temperature, 2 ml. of 30% $H_2O_2$ is added followed by 7 ml. of glacial acetic acid. After standing at room temperature for 21 hours under stirring, a clear, colorless solution is obtained which is added into 40 ml. of 11.7 N of sodium hydroxide solution (outside cooling) and diluted with 60 ml. of water. The solution is extracted with benzene (40+2× 20 ml.)

the combined benzene layers washed with 2.5 N HCl (25 ml.+3× 10 ml.) and the combined HCl extracts are alkalized with 11.7 N NaOH (20 ml.), extracted with ether (2× 25 ml.), dried with MgSO₄ and evaporated to dryness. 0.60 g. of the product is obtained in the form of a sticky oil. On seeding, it crystallizes. It is characterized by forming its salt with oxalic acid in ethanol. M.P. of the hemi-oxalate, 202–203 C. (dec.).

EXAMPLE 6

Following the procedure of Example 5, and substituting the products of Examples 2, 3 and 4 for the 5-[3-(N-methyl - N - methylmercaptoformylamino)propylidene] 5H-dibenzo[a,d]cycloheptene employed in Example 5, there are obtained the following products:

5-(3-methylaminopropylidene)-5H-dibenzo[a,d] cycloheptene 3-chloro-5-(3-methylaminopropylidene)-5H-dibenzo[a,d] cycloheptene 3-methyl-5-(3-methylaminopropylidene)-5H-dibenzo[a,d] cycloheptene 5-(3-methylaminopropyl)-3-methylsulfonyl-5H-dibenzo [a,d] cycloheptene 5-(3-methylaminopropylidene)-3-methylsulfonyl-5H-dibenzo[a,d]cycloheptene 3-dimethylsulfamoyl-5-(3-methylaminopropyl)-5H-dibenzo[a,d]cycloheptene 3-dimethylsulfamoyl-5-(3-methylaminopropylidene) 5H-dibenzo[a,d]cycloheptene

EXAMPLE 7

5-(3-methylaminopropylidene)-3-methylsulfonyl-5H-dibenzo[a,d]cycloheptene (A) Preparation of 5-[3-(N-methyl-N-methylmercaptoformylamino)propylidene] - 3 - methylsulfonyl-5H-dibenzo[a,d]cycloheptene.—To a suspension of 1.76 g. of 5 - (3 - dimethylaminopropyidene)-3-methylsulfonyl-5H-dibenzo[a,d]-cycloheptene in 5 ml. of benzene is added a solution of 1.1 g. of methyl thiolchloroformate in 4 ml. of benzene. The mixture is then refluxed with stirring for 90 minutes. The small amount of insoluble material is filtered off and the filtrate extracted with 2.5 N HCl (3× 8 ml.), washed with water, dried over magnesium sulfate and evaporated in vacuo, yielding the crude thiourethane. After recrystallization from ethanol, the pure thiourethane melts at 144–145° C.

Analysis for $C_{22}H_{23}NO_3S_2$. Calc'd: C, 64.20; H, 5.57; N, 3.4; S, 15.50. Found: C, 63.62; H, 5.39; N. 3.2; S, 15.70.

(B) Preparation of 5-(3-methylaminopropylidene)-3-methylsulfonyl-5H - dibenzo[a,d]cycloheptene.—5-[3-(N-methyl - N-methylmercaptoformylamino)propylidene]-3-methylfonyl-5H-dibenzo[a,d]cycloheptene, 1.06 g., is dissolved in a mixture of 8 ml. of acetic acid and 2 ml. of formic acid. 1 ml. of 30% hydrogen peroxide is then added at 20–25° C., followed with 6 ml. of acetic acid. After standing overnight at room temperature, the mixture is added to 40 ml. of 50% sodium hydroxide while the temperature is kept at 3–10° C. (ice-cooling). After extraction with 30 ml. of benzene. an oil separates. This is separated from the aqueous phase, then dissolved in 50 ml. of 1 N HCl and basified with dilute sodium hydroxide solution. The base is extracted with benzene (3× 30 ml.) and the combined benzene extracts are then reextracted with 2.5 N HCl (3× 30 ml.). The acidic extract is basified and the separated base extracted with diethyl ether. The combined ether extracts are dried over magnesium sulfate and evaporated to give 5-(3-methylaminopropylidene)-3-methylsulfonyl - 5H - dibenzo[a,d]cycloheptene. This is treated with oxalic acid in isopropanol to form the oxalate salt which melts at 204–205° C. (dec.).

EXAMPLE 8

5-(3-methylaminopropylidene)-5H-dibenzo[a,d] cycloheptene (A) Preparation of 5-[3-(N-methyl-N-butylmercaptoformylamino)propylidene] - 5H - dibenzo[a,d]cycloheptene.—To a solution of 2.77 g. of 5-(3-dimethylaminopropylidene)-5H-dibenzo[a,d]cycloheptene in 10 ml. of benzene is added a solution of 1.53 g. of butyl thiolchloroformate in 5 ml. of benzene. The mixture is refluxed with stirring for 3 hours, then filtered, after cooling to room temperature, and the filtrate extracted with 2.5 N sulfuric acid, washed with water, dried over magnesium sulfate and evaporated in vacuo, yielding 5-[3-(N-methyl-N - butylmercaptoformylamino)propylidene]-5H-dibenzo [a,d]cycloheptene.

(B) Preparation of 5-(3-methylaminopropylidene)-5H-dibenzo[a,d]cycloheptene.—To a solution of 1.51 g. of 5 - [3 -(N - methyl - N - butylmercaptoformylamino)propylidene]-5H-dibenzo[a,d]cycloheptene in 15 ml. of formic acid is added, with cooling (ice-water), 2 ml. of 30% hydrogen peroxide. The solution is left standing at room temperature for 2 days. The solvent is then removed by distillation in vacuo and the residue stirred with 30 ml. of 5 N NaOH for 2 hours, extracted with benzene (40+ 20+ 20 ml.), and the combined benzene extracts reextracted with 2.5 N HCl (20 ml. +3× 10 ml.). The HCl extracts are alkalized with 5 N NaOH solution, extracted with ether (3× 20 ml.), dried with magnesium sulfateand exaporated to dryness, yielding 5-(3-methylaminopropylidene)-5H-dibenzo[a,d]cycloheptene. This is treated with oxalic acid in ethanol, yielding the hemioxalate salt which melts at 202–203° C. (dec.).

EXAMPLE 9

5-(3-methylaminopropyl)-5H-dibenzo[a,d]cycloheptene (A) Preparation of 5-[3-(N-methyl-N-phenylmercaptoformylamino)propyl] - 5H - dibenzo[a,d]cycloheptene.— To a solution of 13.9 g. of 5-(3-dimethylaminopropyl)-5H-dibenzo[a,d]cycloheptene in 50 ml. of benzene is added over a period of 20 minutes, a solution of 8.65 g. of phenyl thiolchloroformate in 30 ml. of benzene. The mixture is refluxed with stirring for 1 hour. After cooling to room temperature, the mixture is extracted with 2.5 N HCl (3× 60 ml.), washed with water, dried over magnesium sulfate and evaporated to dryness, yielding 5-[3-N - methyl - N - phenylmercaptoformylamino)propyl]-5H-dibenzo[a,d]cycloheptene.

(B) Preparation of 5-(3-methylaminopropyl)-5H-dibenzo[a,d]cycloheptene.—To a solution of 3.99 g. of 5 - [3 - (N-methyl - N - phenylmercaptoformylamino)propyl]-5H-dibenzo[a,b]cycloheptene in 25 ml. of formic acid is added 4.5 ml. of 30% hydrogen peroxide, and the mixture left standing at room temperature for 2 days. The solvent is distilled off in vacuo at 30–35° C., the residue diluted with water, alkalized to phenolphthalein with 5 N NaOH and extracted with benzene (3× 30 ml.). The combined benzene extracts are reextracted with dilute HCl (4× 25 ml.) and the combined HCl extracts alkalized with 5 N NaOH solution. The product is taken up in diethyl ether (4× 20 ml.), dried over magnesium sulfate and evaporated to dryness, yielding 5 - (3 - methylaminopropyl) - 5H - dibenzo[a,d]cycloheptene.

EXAMPLE 10

5-(3-methylaminopropylidene)-5H-dibenzo[a,d]cycloheptene (a) Preparation of 5-[3-(N-methyl-N-benzylmercaptoformylamino)propylidene] - 5H - dibenzo[a,d]cyclo heptene.—To 5.54 g. of 5-(3-dimethylaminopropylidene)-5H-dibenzo[a,d]cycloheptene, dissolved in 25 ml. of benzene, is added a solution of 3.33 g. of benzyl thiolchloroformate in 20 ml. of benzene. The mixture is refluxed with stirring for 3 hours. The small amount of precipitate is filtered off, the filtrate extracted with 2.5 N sulfuric acid (5× 5 ml.), washed neutral with water, dried over magnesium sulfate and evaporated in vacuo, yielding 5-[3 - (N - methyl - N - benzylmercaptoformylamino)propylidene]-5H-dibenzo[a,d]cycloheptene.

(B) Preparation of 5-(3-methylaminopropylidene)-5H-dibenzo[a,d]cycloheptene.—To 4.11 g. of 5-[3-N-methyl-N-benzylmercaptoformylamino)propylidene] - 5H - dibenzo[a,d]cycloheptene, dissolved in 25 ml. of formic acid, is added 4 ml. of 30% hydrogen peroxide and the mixture allowed to stand at room temperature for 20 hours. After evaporation of the solvent in vacuo, 20 ml. of water is added, followed by the addition of 2.5 N NaOH until a pH of 10 is obtained. The separating oil is extracted with benzene (3× 30 ml.) and the combined benzene extracts reextracted with 2.5 N HCl. The combined HCl extracts are alkalized with 5 N NaOH and the separating oil product extracted with diethyl ether. The ether extract is dried over magnesium sulfate and evaporated to dryness, yielding 5-(3-methylaminopropylidene)-5H-dibenzo[a,d]cycloheptene.

I claim:

1. A method of preparing a compound selected from the group consisting of a 5-(3-methylaminopropyl)-5H-dibenzo[a,d]cycloheptene having the structural formula:

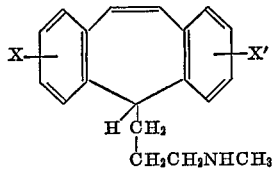

wherein X and X' may be similar or dissimilar and are selected from the group consisting of hydrogen, lower alkyl, halogen, loweralkylsulfonyl and diloweralkylsulfamyl, which comprises reacting the corresponding 5-(3-dimethylaminopropyl)-5H-dibenzo[a,d]cycloheptene with a halothiolformate to produce the corresponding thiourethane derivative of the formula:

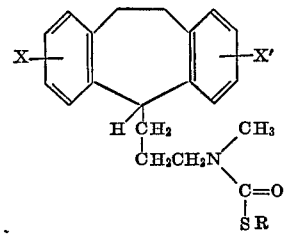

wherein R is selected from the group consisting of lower alkyl having up to 6 carbon atoms, phenyl, tolyl, p-chlorophenyl and benzyl, oxidizing said thiourethane derivative by treatment with an oxidizing agent selected from the group consisting of hydrogen peroxide, peracetic acid, perbenzoic acid, chromic acid and potassium permanganate and hydrolyzing the resulting oxidized thiourethane derivative.

2. A method of preparing a compound selected from the group consisting of a 5-(3-methylaminopropylidene)-5H-dibenzo[a,d]cycloheptenes having the structural formula:

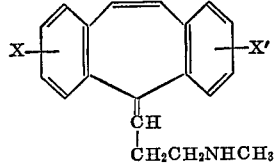

wherein X and X' are as defined as in claim 1 which comprises reacting the corresponding 5-(3-dimethylaminopropylidene)-5H-dibenzo[a,d]cycloheptenes with a halothiolformate to produce the corresponding thiourethane derivative of the formula:

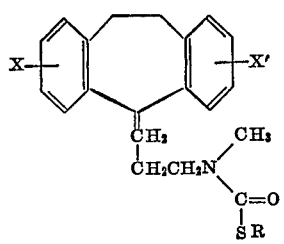

wherein R is selected from the group consisting of lower alkyl having up to 6 carbon atoms, phenyl, tolyl, p-chlorophenyl and benzyl, oxidizing said thiourethane derivative by treatment with an oxidizing agent selected from the group consisting of hydrogen peroxide, peracetic acid, perbenzoic acid, chromic acid and potassium permanganate and hydrolyzing the resulting oxidized thiourethane derivative.

3. A method of preparing a compound selected from the group consisting of 10,11-dihydro(3-methylaminopropyl)-5H-dibenzo[a,d]cycloheptenes having the structural formula:

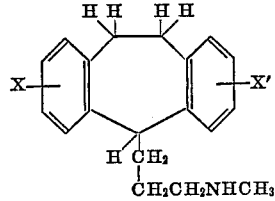

wherein X and X' are as defined in claim 1 which comprises reacting the corresponding 10,11-dihydro-5-(3-methylaminopropyl)-5H-dibenzo[a,d]cycloheptenes with a halothiolformate to produce the corresponding thiourethane derivative of the formula:

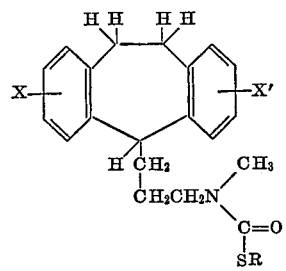

wherein R is selected from the group consisting of lower alkyl having up to 6 carbon atoms, phenyl, tolyl, p-chlorophenyl and benzyl, oxidizing said thiourethane derivative by treatment with an oxidizing agent selected from the group consisting of hydrogen peroxide, peracetic acid, perbenzoic acid, chromic acid and potassium permanganate and hydrolyzing the resulting oxidized thiourethane derivative.

4. A method of preparing a compound selected from the group consisting of a 10,11-dihydro-5-(3-methylaminopropylidene)-5H-dibenzo[a,d]cycloheptenes having the structural formula:

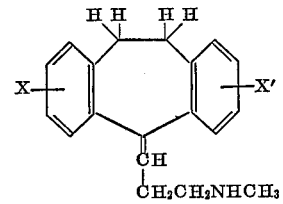

wherein X and X' are as defined in claim 2 which comprises reacting the corresponding 10,11-dihydro-5-(3-dimethylaminopropylidene) - 5H - dibenzo[a,d]cycloheptenes with a halothiolformate to produce the corresponding thiourethane derivative of the formula:

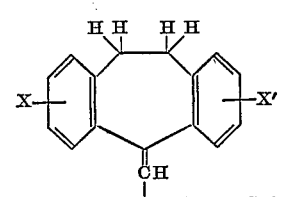

wherein R is selected from the group consisting of lower alkyl having up to 6 carbon atoms, phenyl, tolyl, p-chlorophenyl and benzyl, oxidizing said thiourethane derivative by treatment with an oxidizing agent selected from the group consisting of hydrogen peroxide, peracetic acid, perbenzoic acid, chromic acid and potassium permanganate and hydrolyzing the resulting oxidized thiourethane derivative.

5. The method of preparing 10,11-dihydro-5-(3-methylaminopropylidene) - 5H - dibenzo[a,d]cycloheptenes which comprises reacting 10,11-dihydro-5-(3-dimethylaminopropylidene) - 5H - dibenzo[a,d]cycloheptenes with methylchlorothiolformate to form the compound 10,11-dihydro - 5[3 - (N - methyl - N - methylmercaptoformylamino)propylidene]-5H-dibenzo[a,d]cycloheptenes, oxidizing said dibenzocycloheptenes by treatment with a solution of hydrogen peroxide in glacial acetic acid and hydrolyzing the resulting oxidized product.

6. The method of making 5-(3-methylaminopropyl)-5H-dibenzo[a,d]cycloheptenes which comprises reacting 5 - (3 - dimethylaminopropyl) - 5H - dibenzo[a,d]cycloheptenes with methylchlorothiolformate to form the compound 5-[3-(N - methyl - N - methylmercaptoformylamino)propyl]-5H-dibenzo[a,d]cycloheptenes, oxidizing said dibenzocycloheptenes by treatment with a solution of hydrogen peroxide in glacial acetic acid and hydrolyzing the resulting oxidized product.

References Cited
UNITED STATES PATENTS 3,264,342  8/1966  Schindler _____ 260—570.8 X ROBERT V. HINES, *Primary Examiner.*

U.S. Cl. X.R.

260—455, 465, 471, 501.1, 501.18, 518, 519, 556, 558, 559, 999